(12) United States Patent
Yi

(10) Patent No.: US 6,788,378 B2
(45) Date of Patent: Sep. 7, 2004

(54) METHOD FOR FORMING SPACER OF LIQUID CRYSTAL DISPLAY PANEL

(75) Inventor: Jong-Hoon Yi, Seoul (KR)

(73) Assignee: LG.Philips LCD Co., Ltd., Seoul (KR)

( * ) Notice: Subject to any disclaimer, the term of this patent is extended or adjusted under 35 U.S.C. 154(b) by 12 days.

(21) Appl. No.: 10/133,328

(22) Filed: Apr. 29, 2002

(65) Prior Publication Data

US 2002/0167635 A1 Nov. 14, 2002

(30) Foreign Application Priority Data

May 11, 2001 (KR) .................... P2001-025899

(51) Int. Cl.⁷ .................. G02F 1/1339; G02F 1/13; B41M 5/20; B41M 5/24
(52) U.S. Cl. ............. 349/155; 349/156; 349/187; 503/227
(58) Field of Search ............. 349/155, 156, 349/187; 503/227

(56) References Cited

U.S. PATENT DOCUMENTS

| 5,499,128 | A | * | 3/1996 | Hasegawa et al. .......... 349/155 |
| 5,504,601 | A | * | 4/1996 | Watanabe et al. ............. 349/42 |
| 5,521,035 | A | | 5/1996 | Wolk et al. |
| 5,710,097 | A | * | 1/1998 | Staral et al. ................. 503/227 |
| 6,124,918 | A | * | 9/2000 | Park et al. ................... 349/155 |
| 6,312,122 | B1 | * | 11/2001 | Brown et al. ............... 347/101 |

* cited by examiner

Primary Examiner—Dung T. Nguyen
Assistant Examiner—Jeanne Andrea Di Grazio
(74) Attorney, Agent, or Firm—Morgan, Lewis & Bockius LLP

(57) ABSTRACT

A method for forming a spacer of a liquid crystal display panel includes aligning a transcription film on a substrate, selectively performing a thermal imaging on the transcription film to define a spacer forming region, and removing a portion of the transcription film where the thermal imaging is not performed, thereby forming a plurality of spacers on the substrate.

8 Claims, 3 Drawing Sheets

METHOD FOR FORMING SPACER OF LIQUID CRYSTAL DISPLAY PANEL

This application claims the benefit of the Korean Application No. P2001-025899 filed on May 11, 2001, which is hereby incorporated by reference.

BACKGROUND OF THE INVENTION

1. Field of the Invention

The present invention relates to a liquid crystal display panel, and more particularly, to a method for forming a spacer of a liquid crystal display panel. Although the present invention is suitable for a wide scope of applications, it is particularly suitable for simplifying a process for forming a spacer with a constant thickness and shape.

2. Discussion of the Related Art

Conventionally, a glass bead or a plastic bead having a certain particle diameter is formed on two sheets of substrates to maintain a constant cell-gap. When such spacer particles are randomly scattered on the substrate, so that the spacer is located at the pixel region, a contrast of the liquid crystal display panel is degraded as the incident light is scattered.

In order to solve the problems, there has been proposed a method for forming a spacer by photolithography.

In this method, a photoresist film is coated on a substrate, to which ultraviolet rays are selectively irradiated through a mask and developed to form a spacer in a dot or stripe type, so that a spacer can be selectively formed at the desired location.

In addition, since a cell-gap between the two sheets is controlled by the thickness of the photoresist film, it is easily and precisely controlled.

A method for forming a spacer of a liquid crystal display panel of the conventional art will now be described with reference to FIGS. 1A to 1D.

As shown in FIG. 1A, a photoresist film 2 is coated on a substrate 1 by a spin-coating method.

In FIG. 1B, ultraviolet rays are selectively irradiated on the photoresist film 2 through a mask (not shown) and developed to form a pattern of the photoresist film 2.

A rubbing is performed on the substrate 1 on which the pattern of the photoresist film 2 is formed, as shown in FIG. 1C. Thus, a desired orientation is obtained when a liquid crystal is filled therein.

Thereafter, as shown in FIG. 1D, the other substrate 3 is attached on the substrate 1, so that the two sheets of substrates of the liquid crystal display panel have a constant cell-gap therebetween.

However, the method for forming a spacer of a liquid crystal display panel of the conventional art has the following problems.

Since the photoresist film is exposed through the photolithography method, the spacer area remaining after the development of the photoresist film is enlarged as the photoresist film is more distanced from the light source.

Thus, if the spacer forming region does not have an enough alignment margin, it could be formed to be located at the pixel region, thereby degrading a display characteristic.

In addition, in the case that the photoresist film is formed by the spin-coating method, the film thickness is increased as it is far from the central portion of the film to the marginal portion due to the rotation characteristic. As a result, 0.1 to 1.0 µm in a height difference occurs between the thickness of the central portion spacer and that of the marginal portion spacer.

Thus, a substrate cell-gap of the two sheets is not constantly maintained, so that the luminance at the pixel region is varied with the position of the substrates, thereby generating a spot in a halo form.

SUMMARY OF THE INVENTION

Accordingly, the present invention is directed to a method for forming a spacer of a liquid crystal display panel that substantially obviates one or more of problems due to limitations and disadvantages of the related art.

Another object of the present invention is to provide a method for forming a spacer of a liquid crystal display panel that simplifies the process of forming a spacer with a constant thickness and shape.

Additional features and advantages of the invention will be set forth in the description which follows and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a method for forming a spacer of a liquid crystal display panel includes aligning a transcription film on a substrate, selectively performing a thermal imaging on the transcription film to define a spacer forming region, and removing a portion of the transcription film where the thermal imaging is not performed, thereby forming a plurality of spacers on the substrate.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention.

In the drawings.

DETAILED DESCRIPTION OF THE ILLUSTRATED EMBODIMENTS

Reference will now be made in detail to the illustrated embodiments of the present invention, examples of which are illustrated in the accompanying drawings. Wherever possible, the same reference numbers will be used throughout the drawings to refer to the same or like parts.

Figure 1A:
FIGS. 1A to 1D are cross-sectional views illustrating a method for forming a spacer of a liquid crystal display panel in accordance with a conventional art.
Figure 1B:
Figure 1C:
Figure 1D:
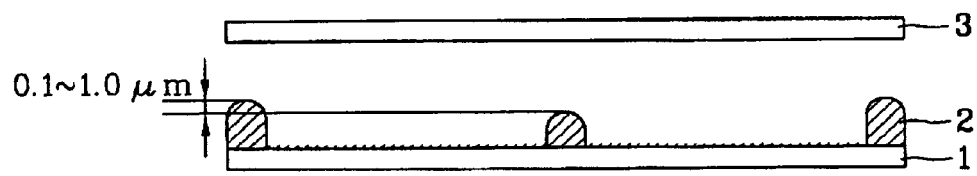
Figure 2A:
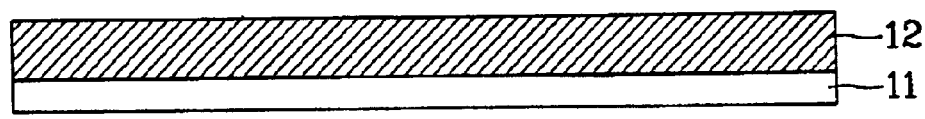
FIGS. 2A to 2C are cross-sectional views illustrating a method for forming a spacer of a liquid crystal display panel in accordance with a first embodiment of the present invention.
Figure 2B:
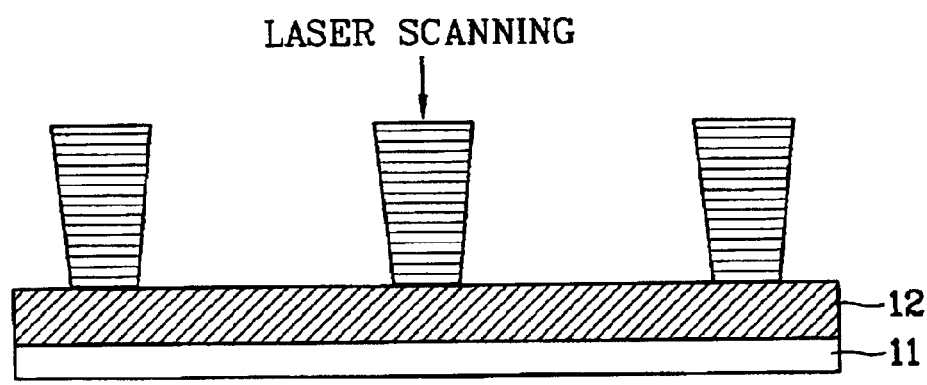
Figure 2C:
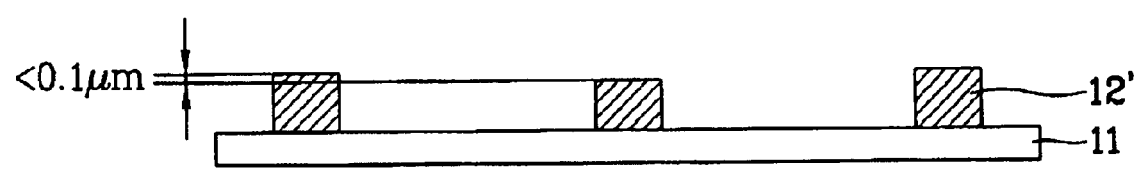

FIGS. 2A and 2C are cross-sectional views illustrating a method for forming a spacer of a liquid crystal display panel in accordance with a first embodiment of the present invention.

As shown in FIG. 2A, a transcription film 12 consisting of a transparent organic layer, a light-to-heat conversion layer, and a supporting layer is formed on a substrate 11. In addition, an adhesion layer may be included in the transcription film 12.

For the substrate 11, a material transmitting light, for example, glass may be used. A plurality of gate lines, data lines, pixel electrodes, thin film transistors, and storage capacitors or the like are formed on the glass substrate 11, so as to serve as a thin film transistor array substrate of the liquid crystal display panel. On the other hand, color filters, a black matrix, and a common electrode are formed on the glass substrate 11, so as to serve as a color filter substrate of the liquid crystal display panel.

The transcription film 12 includes the transparent organic layer, a light-to-heat conversion layer, and the supporting layer, which is disclosed in the U.S. Pat. No. 5,521,035, and a transparent layer or a color layer may be additionally stacked at the upper portion of the light-to-heat conversion layer.

When the transcription film 12 is formed to have a thickness of 4.5 $\mu$m, it may have a thickness uniformity within ±0.1 $\mu$m.

As shown in FIG. 2B, a thermal imaging or a laser transcription is selectively performed on the transcription film 12 to define a spacer forming region.

By the thermal imaging or the laser transcription, a square region as small as 1 $\mu$m×1 $\mu$m may be defined, so that a spacer pattern of about 8 to 10 $\mu$m×8 to 10 $\mu$m in length and width may be defined without an error.

Meanwhile, in case that a spacer forming region is defined through the thermal imaging, the transcription film 12 becomes selectively adhesive to the substrate 11 in the spacer forming region by the heat.

Alternatively, when the spacer forming region is defined through the laser transcription, the heat is transferred to the adhesion layer through the light-to-heat conversion layer of the transcription film 12. Thus, the adhesion layer becomes selectively adhesive to the substrate 11 in the spacer forming region.

As shown in FIG. 2C, the region of the transcription film 12 that is not defined by the thermal imaging or the laser transcription is removed. Thus, a spacer pattern 12' is formed on the substrate 11.

At this time, the adhesion layer of the spacer forming region is selectively adhesive to the substrate 11. Thus, when the transcription film 12 is lifted off, only the transcription film 12 in the spacer forming region remains. The remaining transcription film 12 does not have a step and serves as a uniform spacer pattern 12'.

In the first embodiment of the present invention as described above, the spacer pattern of the transcription film 12 consisting of the transparent organic layer, the light-to-heat conversion layer, and the supporting layer is formed and subjected to a rubbing.

A second embodiment of the present invention will now be described in detail with reference to FIGS. 3A to 3D.

Figure 3A:
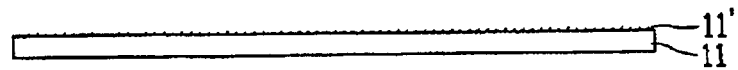
FIGS. 3A to 3D are cross-sectional views illustrating a method for forming a spacer of a liquid crystal display panel in accordance with a second embodiment of the present invention.
Figure 3B:
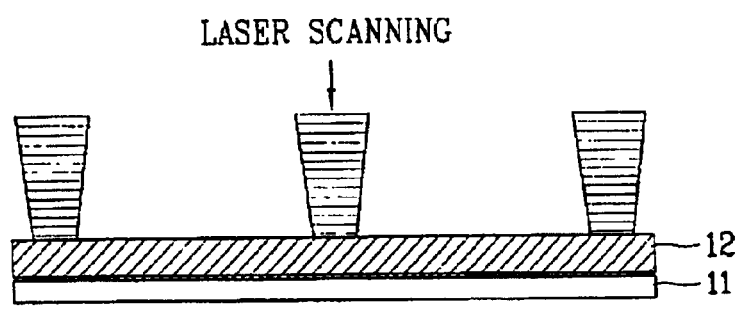
Figure 3C:
Figure 3D:

FIGS. 3A and 3D are cross-sectional views illustrating a method for forming a spacer of a liquid crystal display device in accordance with a second embodiment of the present invention.

As shown in FIG. 3A, a rubbing is performed on the substrate 11 so that the substrate has a desired orientation 11' when a liquid crystal is filled therein.

Similar to the first embodiment of the present invention, glass may be used for the substrate 11. A plurality of gate lines, data lines, pixel electrodes, thin film transistors, and storage capacitors or the like are formed on the glass substrate 11 to serve as a thin film transistor array substrate of the liquid crystal display device. On the other hand, color filters, a black matrix, and a common electrode are formed on the glass substrate 11 to serve as a color filter substrate of the liquid crystal display device.

In FIG. 3B, a transcription film 12 consisting of a transparent organic layer, a light-to-heat conversion layer, and a supporting layer is formed on the substrate 11. An adhesive layer may be included in the transcription film 12.

Similar to the first embodiment of the present invention, when the transcription film 12 is formed with a thickness of 4.5 $\mu$m. it has a uniform thickness of a thickness difference of 0.1 $\mu$m at the whole region of the substrate 11.

As shown in FIG. 3C, a thermal imaging or a laser transcription is selectively performed on the transcription film 12 to define a spacer forming region.

The thermal imaging or the laser transcription may accurately define a spacer pattern of about 8 to 10 $\mu$m×8 to 10 $\mu$m in length and width without an error. The adhesion layer of the spacer forming region is selectively adhesive to the substrate 11 by the thermal imaging or the laser transcription in the same manner as in the first embodiment.

As shown in FIG. 3D, the region of the transcription film 12 that is not defined through the thermal imaging or the laser transcription is selectively removed to form a spacer pattern.

At this time, the transcription film 12 is removed by lifting off in the same manner as in the first embodiment, so that the transcription film 12 remaining at the spacer forming region does not have a step, thereby functioning as a uniform spacer pattern.

In the conventional art, since a spacer pattern is formed through photolithography, if a rubbing is first performed on the substrate, the rubbed surface may be damaged due to the coating and developing of the photoresist film, causing deficiency in the orientation of the liquid crystal.

However, in the present invention, after the transcription film 12 consisting of the transparent organic layer, the light-to-heat conversion layer, and the supporting layer is formed, the thermal imaging or the laser transcription is selectively performed to define the spacer forming region. Also, since the spacer pattern is formed by employing the method of lifting off the transcription film 12, the rubbed surface is not damaged by the following photolithography.

Therefore, as shown in the second embodiment of the present invention, a rubbing is performed before forming a spacer pattern. Even if the rubbing is performed prior to forming the spacer pattern, the rubbing may be uniformly performed at the region where the spacer pattern is formed. Thus, a light leakage caused by the rubbing deficiency may be prevented.

As described above, the spacer forming method of a liquid crystal display panel has many advantages.

In the present invention, the transcription film consisting of the transparent organic layer, the light-to-heat conversion layer, and the supporting layer is used to define a spacer forming region by the thermal imaging or the laser transcription. The spacer pattern is then formed through a method of lifting off the transcription film 12. Thus, the complicated process of the conventional art according to coating and developing of the photoresist film is simplified by the present invention.

In addition, the thickness and the shape of the spacer pattern is precisely controlled and formed uniformly, so that an alignment margin of the spacer is improved. Thus, a display quality of the liquid crystal display panel is maintained. Further, since two substrates are maintained with a constant cell-gap, luminance of the pixel region is not maintained throughout the substrate. As a result, a spot having a halo form does not appear on the display panel.

Moreover, the rubbing is performed before forming the spacer pattern on the substrate in the second embodiment of the present invention, it is uniformly performed at the region where the spacer pattern is formed, so that a light leakage due to the rubbing deficiency can be prevented.

It will be apparent to those skilled in the art that various modifications and variations can be made in the method for forming a spacer of a liquid crystal display panel of the present invention without departing from the spirit or scope of the inventions. Thus, it is intended that the present invention covers the modifications and variations of this invention provided they come within the scope of the appended claims and their equivalents.

What is claimed is:

1. A method for forming a spacer of a liquid crystal display panel comprising:

aligning a transcription film on a substrate, the substrate having a desired rubbing orientation;

selectively performing thermal imaging in the transcription film to define a spacer forming region; and removing a portion of the transcription film where the thermal imaging is not performed, thereby forming a plurality of spacers on the substrate.

2. The method of claim 1, wherein the transcription film includes a transparent organic layer, a light-to-heat conversion layer, and a supporting layer.

3. The method of claim 2, wherein the transcription film includes an adhesion layer on the transparent organic layer.

4. The method of claim 2, wherein spacers are formed by thermal imaging of the transparent organic layer.

5. The method of claim 1, wherein the removing a portion of the transcription film is performed by lifting off.

6. The method of claim 1, wherein the substrate is transparent to visible light.

7. The method of claim 1, wherein the spacers have a difference in height that is less than 0.1 µm.

8. A method of forming a spacer of a liquid crystal display panel comprising:

aligning a transcription film on a substrate;

selectively performing a thermal imaging in the transcription film to define a spacer forming region; and removing a portion of the transcription film where the thermal imaging is not performed, thereby forming a plurality of spacers on the substrate, wherein the substrate is rubbed prior to the aligning of a transcription film on a substrate.

\* \* \* \* \*